(12) United States Patent
Baehr et al.

(10) Patent No.: US 7,555,942 B2
(45) Date of Patent: Jul. 7, 2009

(54) METHOD AND DEVICE FOR CHECKING THE AUTO-OPENING FUNCTION OF AN ACTUATOR-OPERATED CLUTCH

(75) Inventors: Markus Baehr, Achern (DE); Juergen Gerhart, Appenweier (DE); Michael Schuhen, Buehl-Oberweier (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 71 days.

(21) Appl. No.: 11/803,889

(22) Filed: May 16, 2007

(65) Prior Publication Data
US 2007/0267268 A1 Nov. 22, 2007

(30) Foreign Application Priority Data
May 20, 2006 (DE) .................. 10 2006 023 807

(51) Int. Cl.
*G01M 13/02* (2006.01)
(52) U.S. Cl. .................................... 73/115.04
(58) Field of Classification Search .............. 73/115.01, 73/115.02, 115.03, 115.04, 116.04
See application file for complete search history.

(56) References Cited

U.S. PATENT DOCUMENTS

| | | | | |
|---|---|---|---|---|
| 5,847,272 A | * | 12/1998 | Schneider et al. | 73/115.02 |
| 7,313,943 B2 | * | 1/2008 | Smith | 73/1.79 |
| 2007/0158160 A1 | * | 7/2007 | Puiu | 192/70.23 |
| 2009/0064774 A1 | * | 3/2009 | Panzer et al. | 73/115.04 |

* cited by examiner

*Primary Examiner*—Eric S McCall
(74) *Attorney, Agent, or Firm*—Simpson & Simpson, PLLC

(57) ABSTRACT

In a method for checking the auto-opening function of an actuator-operated clutch, the clutch is moved out of its closed position into its open position or out of its open position into its closed position by the actuator at a predetermined constant speed. During this movement of the clutch a force/distance curve is recorded; the point of the path at which the force is minimal is determined; and the clutch is moved to the determined path point by the actuator. The actuator is deactivated; and it is checked whether following deactivation of the actuator, the clutch returns into its open position in a predetermined manner.

7 Claims, 2 Drawing Sheets

METHOD AND DEVICE FOR CHECKING THE AUTO-OPENING FUNCTION OF AN ACTUATOR-OPERATED CLUTCH

CROSS-REFERENCE TO RELATED APPLICATION

This patent claims priority of German patent application 10 2006 023 807.9, filed May 20, 2006, which application is incorporated herein by reference.

FIELD OF THE INVENTION

The invention relates to a method and a device for checking the auto-opening function of an actuator-operated clutch.

BACKGROUND OF THE INVENTION

Especially in the case of twin clutch transmissions or parallel gearboxes, the clutches are constructed in such an advantageous manner that, when their actuators fail, they open automatically. Even for referencing the position of the clutch actuating system, one proceeds preferably on the assumption of an auto-opening clutch system, where, for example, upon deactivating the actuator, an opening position, which is defined by a stop abutment, is actuated automatically. This opening position is used for referencing an incremental sensor, which serves as the position sensor.

BRIEF SUMMARY OF THE INVENTION

The invention is based on the problem of providing one possibility, with which a flawless auto-opening function of a clutch may be reliably detected and/or monitored.

This problem is solved by means of the method and the devices, as disclosed in the attached patent claims.

According to a first implementation of a method for checking the auto-opening function of an actuator-operated clutch, the clutch is moved out of its closed position into its open position or out of its open position into its closed position by the actuator at a predetermined constant speed. During this movement, the force, generated by the actuator, is recorded. If a predetermined value of the force is exceeded or is not attained, this feature is evaluated as a defective auto-opening.

In an alternative implementation of a method for checking the auto-opening function of an actuator-operated clutch, the clutch is moved out of its closed position into its open position or out of its open position into its closed position by the actuator at a predetermined constant speed. During this movement of the clutch, the point of the path, at which the force is minimal, is determined. The clutch is moved by the actuator to the determined point of the path. The actuator is deactivated, and it is checked whether, following deactivation of the actuator, the clutch returns in a predetermined manner into its open position.

The actuator is advantageously an electric motor, and the force is determined by recording the voltage of the electric motor, regulated to a constant speed.

The checking whether, following deactivation of the actuator, the clutch returns in a predetermined manner into its open position, is done, for example, by checking whether the clutch returns into its open position within a defined period of time.

As an alternative or in addition, it can be checked whether the clutch moves in the direction of its open position at least at a predetermined minimum speed.

According to another method for checking the auto-opening function of an actuator-operated clutch, the clutch is moved out of its closed position into its open position or out of its open position into its closed position by an actuator at a predetermined constant force. During this movement the speed is recorded. If a predetermined value of the opening speed is exceeded and/or if a predetermined value of the opening speed is not attained, this feature is evaluated as a defective opening function.

A device for checking the auto-opening function of an actuator-operated clutch includes advantageously a clutch, which closes against the force of an opening spring, and an actuator for operating the clutch. In the event that the function—system function—operates flawlessly, the actuator in the activated state of the clutch closes against the force of the opening spring; and in the deactivated state of the actuator the clutch is forced out of the closed position into the open position by the opening spring. The device also includes a force measuring unit for recording the force, generated by the actuator on the clutch during the opening or closing operation of the clutch, and an evaluating unit for determining the minimum and/or maximum value of the force during the opening or closing operation of the clutch.

Furthermore, a speed control unit may be provided for controlling the actuator in such a manner that the clutch is opened at a constant speed.

Another embodiment of the device according to the invention includes a position sensor for detecting the position of the clutch during the opening operation. Said position sensor is connected to the evaluating unit, which during the opening operation of the clutch determines the path point at which the force is minimal. The device also includes a control unit, which controls the actuator in such a manner that, following the opening operation, the clutch moves to the determined path point, and which deactivates the actuator. Following the deactivation of the actuator, the evaluating unit monitors a return of the clutch into the open position and compares with at least one predetermined return parameter.

BRIEF DESCRIPTION OF THE DRAWINGS

The invention is explained below as an example and with other details. In the individual figures.

DETAILED DESCRIPTION OF THE INVENTION

Figure 1:
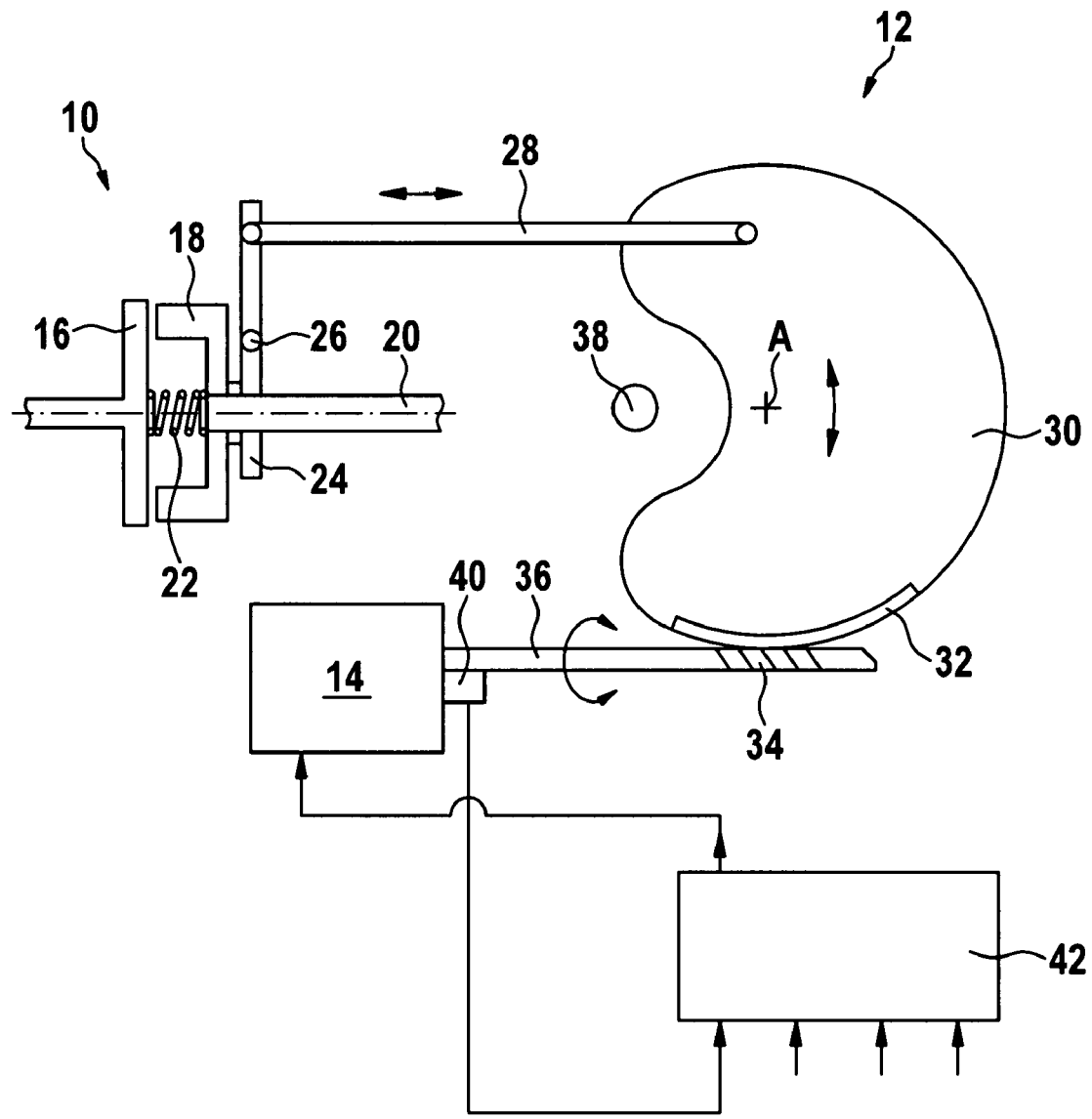
FIG. 1 depicts one example of an auto-opening clutch, which is operated with the aid of an actuator; and, FIG. 2 is a flow chart in order to explain the invention.

According to FIG. 1, a clutch, all of which is labeled 10 and which includes, for example, a drive train of a motor vehicle, is connected to an actuator, which is constructed as electric motor 14, by means of a transfer mechanism, all of which is labeled 12.

The clutch includes disk 16, which is driven in rotation, for example, by the crankshaft of an internal combustion engine and which can be forced against clutch disk 18, which is connected to shaft 20 in a rotationally rigid, but axially displaceable manner. The shaft is, for example, an input shaft of a transmission or rather a partial transmission of a parallel gearbox. Spring 22, which is disposed between disk 16 and clutch disk 18, pushes clutch disk 18 away from disk 16, i.e., the clutch in its entirety into the open position. In order to move clutch disk 18 against disk 16, i.e., in order to close the clutch, there is clutch lever 24, which is mounted so as to swivel about bearing 26. The free end of the clutch lever is connected in an articulated manner to actuating element 28.

The end of actuating element 28 that faces away from clutch lever 24 is connected in an articulated manner to segmented disk 30, which can be swiveled or rotated about axis A and which exhibits a peripheral area, provided with toothing 32. Toothing 32 meshes with toothing 34 of output shaft 36 of electric motor 14.

The rotatability of segmented disk 30 is limited by stop abutment 38, against which the peripheral rim of segmented disk 30 rests, for example, in the totally open position of the clutch.

The rotation of output shaft 36, and thus the movement of clutch lever 24, are detected by incremental sensor 40, which is connected to an input of electronic control unit 42, which exhibits a current or rather voltage supply output for electric motor 14.

The construction and function of the described arrangements are well known in themselves, and are therefore not explained in detail.

The meshing of toothings 32 and 34 is not self-locking; and electric motor 14 can be deactivated or switched over in a free running mode by control unit 42, so that when functioning flawlessly, clutch 10 is pushed or rather moved into its open position by spring 22. The open position is detected, for example, when segmented disk 30 strikes against stop abutment 38 or when output shaft 36 comes to a standstill, and may be used for referencing the count of an incremental counter, which is located in control unit 42 and is assigned to incremental sensor 40.

In order to close the clutch, electric motor 14 is actuated by control unit 42, so that when segmented disk 30 is rotated clockwise and clutch lever 24 is swiveled clockwise, the clutch is moved into the closed position. The closed position in turn may be detected through impact or may be controlled or regulated in such a manner that between disks 16 and 18 there is a predetermined drift, which is detected by speed sensors (not illustrated).

Figure 2:
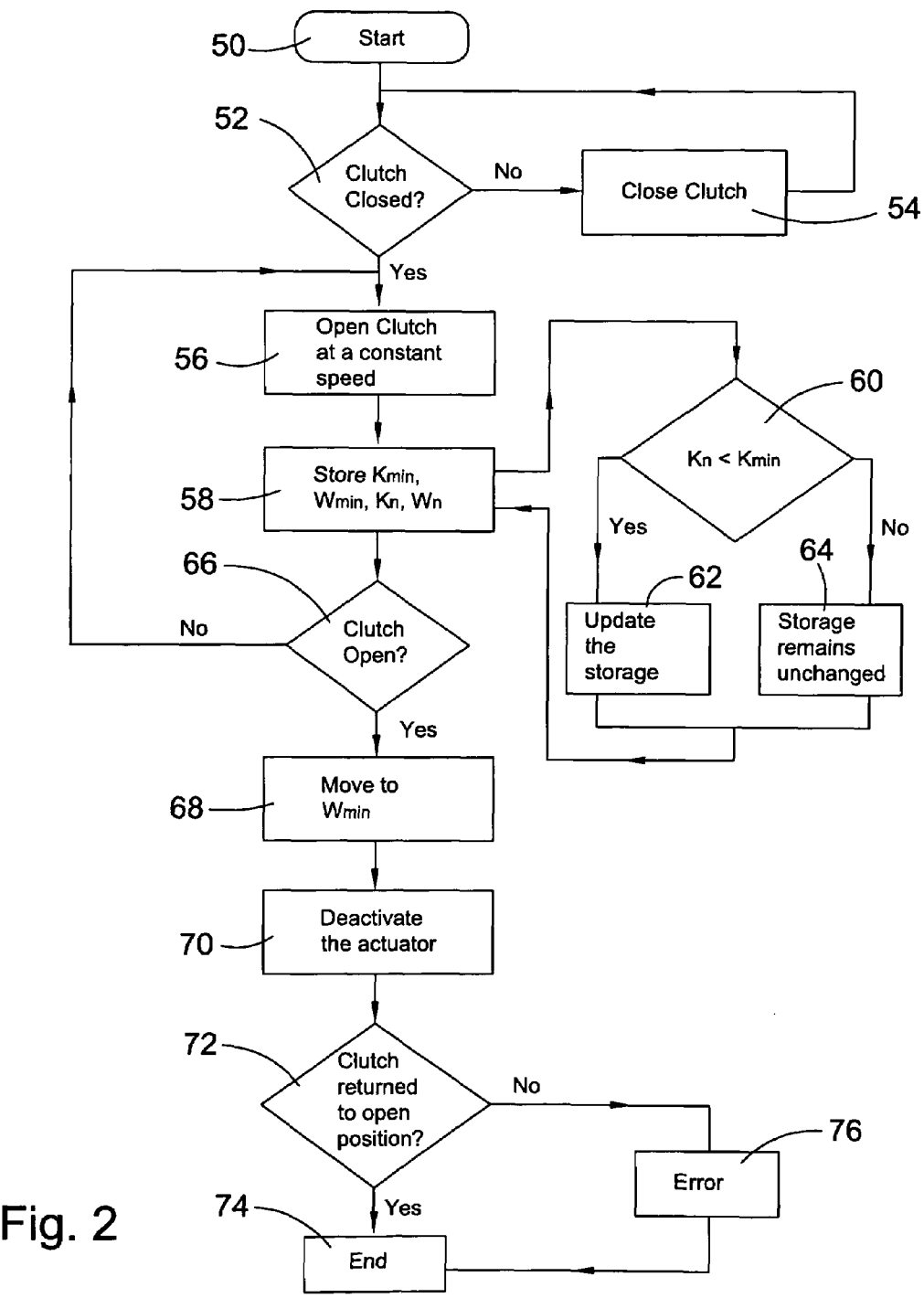

A method, with which the auto-opening function of clutch 10 may be checked, is described below, and illustrated in FIG. 2.

In step 50 a test program is activated in control unit 42, a feature that may be implemented, for example, in a twin clutch transmission, whenever no gear is chosen in the related partial transmission. In step 52 it is checked whether clutch 10 is in the closed state. If this is not the case, then in step 54 the clutch is closed. If the clutch is closed, then in step 56 electric motor 14 is driven in such a manner that clutch 10 opens at a constant speed, i.e., output shaft 36 rotates at a constant speed. By specifying a constant speed, the effects, induced by the actuator dynamics, are suppressed. The chosen speed ought to fulfill two conditions:

The speed should be so low that the speed regulator, contained in control unit 42, has an adequate amount of time, even on short paths, to adapt to defects caused, for example, by a change in the counterforce issuing from the clutch.

Furthermore, the speed should be chosen so low that the effect of the inductance can be ignored (the effective resistance of the electric motor changes owing to the inductance at the motor speed).

Furthermore, the speed must be chosen in such a way that at a predetermined position resolution of incremental sensor 40 and the available sampling time, the speed results in "smooth" speed signals. For example, approximately 0.5 to 1.0 position increments are necessary per position regulator interval.

If the angle resolution of the incremental sensor is, for example, 42 increments per revolution and the sampling time is 2.5 milliseconds, then the result is a speed of about 571 $\min^{-1}$. If the speed signal in the position regulator is determined by means of the last two intervals, the result is a speed of approximately 285 $\min^{-1}$. This speed can be preset as the direct target speed for the speed regulator, or a position ramp, which corresponds to the desired speed, may be preset. However, in this respect it must be ensured that in every position regulator the target position is updated in an interrupt manner.

It may be necessary to deactivate a load input control, which may have been used in the clutch actuating system, for the duration of the position ramp/constant speed measurement, since a misadaptation in the load mapping may lead to defects in the actuator voltage.

The actuator voltage during the movement of the actuator yields theoretically:

$$U=[(M_L R)/k_{526}]+\omega k_\varnothing, \text{where}$$

$M_L$=actuator load torque;
$k_\varnothing$=motor constant of the actuator motor;
$R$=resistance in the motor circuit;
$\omega$=actuator motor angle speed; and,
$\omega k_\varnothing$=speed-dependent voltage offset.

For the auto-opening operation ($\omega<O$), the actuator voltage U must be above a lower limit $U_{min}$ so that it is guaranteed that the system will open automatically without the actuator voltage. That is, spring 22 suppresses the no-load torque of deactivated electric motor 14 and the friction in the system. This minimum voltage is the product of a minimum actuator load $M_{Lmin}$ that is necessary for a reliable auto-opening of the clutch in an adequately short amount of time.

$$U_{min}=[(M_{Lmin}R)/k_\varnothing]-\omega k_\varnothing$$

It must be pointed out that in evaluating the properties of the auto-opening operation, the speed-dependent offset $\omega k_\varnothing$ must be constant or at least known. This assumes a flawless measurement of the motor speed $\omega$ and a knowledge of the motor constant $k_\varnothing$. If during the test movement at a constant speed (position ramp) the actuator voltage drops below this minimum value, the auto-opening operation is at risk.

The exact voltage values are highly dependent on the respective actuator system. The motor constant $k_\varnothing$ can be determined from a comparison of the holding voltage limits, which can be determined from the actuator load mapping, and the voltages during position ramp travel, because this voltage differential is exactly equivalent to the value of $\omega k_\varnothing$.

In order to evaluate the actuator voltage, a low pass filtering is advantageous for noise reduction, which can be done with a simple PT1 filter. In order not to lose the relation between the actuator voltage and the actuator position, the respectively new actuator position should be filtered with the same low pass filter.

In the method according to the invention, a defect in the auto-opening function of the clutch may be determined in that during the opening movement at a constant speed (step 56) the actuator voltage or rather the voltage, applied to electric motor 14, drops below a predetermined minimum voltage (the actuator voltage is a measure for the force, which is generated by the actuator on clutch lever 24).

It is advantageous to determine during the opening movement the minimum voltage or rather the minimum force, with which the electric motor brakes the opening movement of the clutch, and to move the clutch—after the clutch has been fully opened subject to the failure of the actuator (electric motor)—to the point where the minimum force prevails in order to test subsequently whether the clutch will open automatically from this critical position. To this end, in step 58 two pairs of values—$K_{min}$, $W_{min}$; $K_n$, $W_n$—which are measured in succession during the opening movement of the clutch, are stored, where $K_{min}$ and $W_{min}$ are the initial values of the force and the related position of the clutch (path $W_n$); and the value of n increases as a function of the clock frequency of the system. In step 60 it is then checked whether the updated force $K_n$ is less than the previously stored force $K_{min}$. If this is the case, then in step 62 the storage (step 58) is updated. The value $K_{min}$ is set to the currently measured smaller force $K_n$, and the value $W_{min}$ is set to the related current value $W_n$. If this is not the case, then the stored values $K_{min}$ and $W_{min}$ remain unchanged in step 64. The opening movement continues so that the respective current value $K_n$ is compared with the previously stored value $K_{min}$; and if the current value $K_n$ lies below the stored value $K_{min}$, then $K_{min}$ and $W_{min}$ are updated to the current value. The process continues until it is determined in step 66 that the clutch is open. Then the system goes to step 68, where one continues with the actuator of the last stored value $W_{min}$. That is, the clutch is moved into the position, in which during the opening movement the minimum force for holding constant the opening speed was necessary. When this point is reached, the actuator is deactivated or set to "disable" in step 70, so that the electric motor is situated in no load (the power transistors driving said electric motor exhibit high resistance); and in step 72 it is checked whether the clutch will return into the opening position in a predetermined manner. In so doing, one can wait for a period of time and then check whether the opening position will be reached in this period of time (segmented disk 30 strikes against stop abutment 38). Furthermore, one can monitor whether within a defined period of time a minimum distance has been traveled and/or whether electric motor 14, driven in rotation by spring 22, reaches a predetermined speed.

Subsequent to the time when the speed or the traveled distance are evaluated, it may also be detected whether the auto-opening operation functions with adequate dynamics. If that is not the case, then this may indicate the need to readjust the clutch.

If step 72 is terminated with positive results, the program ends in step 74. Otherwise, step 74 is reached by way of an error message (step 76), which may be connected with the initiation of safety strategies.

In the described method, in which the automatic opening of the clutch is braked normally by the actuator, it may happen that during the opening operation at the predetermined speed the voltage, applied to the actuator, may drop to zero; or an alternation of polarity may be even necessary, if the clutch has to be pulled up by the actuator. This may be evaluated then directly as an error with respect to the automatic opening of the clutch, or in the described minimum evaluation of the voltage, the alternation of polarity is evaluated as a further decrease in the voltage (in the direction of the alternation in polarity) so that this voltage is then determined as the minimum value; and the clutch is moved to the related position.

The described method for finding the force and/or voltage minimum may also be carried out in that during the entire opening movement a force-distance curve is recorded and stored. Then, upon reaching the opening position, the force-distance curve is evaluated with respect to the force minimum.

The described method, in which the force minimum is determined as a function of the preferred method of implementation during the opening movement of the clutch, may also be carried out in that the clutch is moved from the open position into the closed position by the actuator; and, in so doing, the force minimum is determined.

In a modified implementation of the method, the clutch is moved into its open position or into its closed position by the actuator at a predetermined constant force or rather constant torque of the electric motor, and during this movement the speed is recorded. If during the opening or closing operation, the speed falls below or exceeds a preset value, this indicates a defect in the auto-opening function.

Both the method, in which only the force, generated during the actuation of the clutch (preferably in the direction of opening) at a constant actuating speed, or the speed, generated at the clutch operated at a constant force, is recorded, and a test of the auto-opening function of the clutch is not carried out starting from a critical point (point of minimum force or maximum speed), may also monitor the occurrence of an inadmissibly high actuating force at a constant actuating speed or an inadmissibly low speed at a constant actuating force, because this, too, may indicate a defect in the clutch actuating system, for example, a sluggishness or a seizure of a bearing.

The invention may be used for a variety of different clutch actuating systems. For example, a hydraulic transmission path may be assigned to the actuator and the actuating lever. The clutch may be operated altogether hydraulically, pneumatically or in some other way.

LIST OF REFERENCE NUMERALS

10 clutch
12 transfer mechanism
14 electric motor
16 disk
18 clutch disk
20 shaft
22 spring
24 clutch lever
26 bearing
28 actuating element
30 segmented disk
32 toothing
34 toothing
36 output shaft
38 stop abutment
40 incremental sensor
42 electronic control unit

What is claimed is:

1. A method for checking an auto-opening function of an actuator-operated clutch, comprising the steps of:
    moving the clutch out of a closed position into an open position or out of an open position into a closed position by the actuator at a predetermined constant speed;
    determining a point of the path at which a force generated by the actuator is minimal during this movement of the clutch;
    moving the clutch by the actuator to the determined path point;
    deactivating the actuator; and,
    determining if the clutch returns in a predetermined manner into its open position following deactivation of the actuator.

2. The method as recited in claim 1, wherein the actuator is an electric motor;
    and the force is determined by recording the voltage of the electric motor, regulated to a constant speed.

3. The method as recited in claim 1, further comprising the step of determining whether the clutch moves in the direction of its open position at least at a predetermined minimum speed.

4. The method as recited in claim 1, further comprising the step of determining whether the clutch moves into its open position within a defined period of time.

5. The method as recited in claim 4, further comprising the step of determining whether the clutch moves in the direction of its open position at least at a predetermined minimum speed.

6. The method recited in claim 1, further comprising the steps of:

recording the force generated by the actuator while the clutch is moving; and, classifying as a defective auto-opening function if a predetermined value of the force is exceeded or is not attained.

7. The method recited in claim 6, wherein the actuator is an electric motor, and the force is determined by recording the voltage of the electric motor, regulated to a constant speed.

* * * * *